United States Patent
Saito et al.

(10) Patent No.: US 9,868,502 B2
(45) Date of Patent: Jan. 16, 2018

(54) STERN TUBE SEALING DEVICE

(71) Applicant: EAGLE INDUSTRY CO., LTD., Tokyo (JP)

(72) Inventors: Kenichi Saito, Tokyo (JP); Hiroyuki Sada, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 3 days.

(21) Appl. No.: 14/375,563

(22) PCT Filed: Jul. 8, 2013

(86) PCT No.: PCT/JP2013/068653
§ 371 (c)(1),
(2) Date: Jul. 31, 2014

(87) PCT Pub. No.: WO2014/017285
PCT Pub. Date: Jan. 30, 2014

(65) Prior Publication Data
US 2015/0137458 A1 May 21, 2015

(30) Foreign Application Priority Data
Jul. 27, 2012 (JP) .................. 2012-167520

(51) Int. Cl.
*F16J 15/00* (2006.01)
*B63H 23/36* (2006.01)
(Continued)

(52) U.S. Cl.
CPC .............. *B63H 23/36* (2013.01); *B63H 1/14* (2013.01); *B63H 23/321* (2013.01);
(Continued)

(58) Field of Classification Search
CPC .. F16J 15/16; F16J 15/34; F16J 15/162; F16J 15/006; F16J 15/008; F16J 15/3448;
(Continued)

(56) References Cited

U.S. PATENT DOCUMENTS 2,946,608 A * 7/1960 Gilbert, Sr. ............ B63H 23/36
277/401
3,625,523 A * 12/1971 Gardner ............... B63H 23/321
277/563
(Continued)

FOREIGN PATENT DOCUMENTS

DE 3122406 A1 12/1982
EP 1256518 A2 11/2002
(Continued)

OTHER PUBLICATIONS

Clean—Clean definition The Free Dictionary.*
(Continued)

*Primary Examiner* — Nathan Cumar
(74) *Attorney, Agent, or Firm* — Harness, Dickey & Pierce, P.L.C.

(57) ABSTRACT

In a stern tube sealing device, slurry contained in outboard water is suppressed from depositing on sliding portions between a wall surface of a seal ring chamber or an outer peripheral surface of a propeller shaft and a sealing surface of a seal ring. A first seal ring (121) is arranged in a first seal ring chamber (111), and a second seal ring (122) is arranged in a second seal ring chamber (112) which is formed at an inboard side of the first seal ring chamber. The first seal ring chamber and the second seal ring chamber are in communication with each other through the sliding portions between a wall surface of the first seal ring chamber and a sealing surface (121a) of the first seal ring. Outboard water (Continued)

is filled into the first seal ring chamber, and clear water is filled into the second seal ring chamber.

3 Claims, 4 Drawing Sheets

(51) Int. Cl.
   *F16J 15/34*     (2006.01)
   *B63H 23/32*    (2006.01)
   *B63H 1/14*     (2006.01)
   *F16J 15/16*    (2006.01)
   *F16J 15/324*   (2016.01)
   *F16J 15/40*    (2006.01)

(52) U.S. Cl.
   CPC ............ *F16J 15/002* (2013.01); *F16J 15/16* (2013.01); *F16J 15/324* (2013.01); *F16J 15/3404* (2013.01); *F16J 15/3448* (2013.01); *F16J 15/3456* (2013.01); *F16J 15/40* (2013.01); *B63H 2023/327* (2013.01)

(58) Field of Classification Search
   CPC ...... F16J 15/3456; F16J 15/002; F16J 15/324; F16J 15/3404; F16J 15/40; B63H 23/36; B63H 1/14; B63H 23/321; B63H 2023/327
   USPC ....................................................... 277/500
   See application file for complete search history.

(56) References Cited

U.S. PATENT DOCUMENTS

| | | | | |
|---|---|---|---|---|
| 4,395,141 | A | * | 7/1983 | Pietsch et al. ................ 384/147 |
| 4,482,158 | A | * | 11/1984 | Ishitani et al. ................ 277/353 |
| 4,984,811 | A | * | 1/1991 | Kuwabara et al. ........... 277/563 |
| 5,643,026 | A | * | 7/1997 | Pietsch ................ B63H 23/321 |
| | | | | 277/320 |
| 6,481,720 | B1 | * | 11/2002 | Yoshida ............... B63H 23/321 |
| | | | | 277/400 |
| 2002/0090865 | A1 | * | 7/2002 | Von Bergen ......... B63H 23/321 |
| | | | | 440/83 |

FOREIGN PATENT DOCUMENTS

| | | | | |
|---|---|---|---|---|
| EP | 1493659 | A1 | 1/2005 | |
| GB | 2205365 | A | 12/1988 | |
| JP | 52115096 | | 9/1977 | |
| JP | 066194 | | 1/1994 | |
| JP | H07-10084 | A | 1/1995 | |
| JP | 2000238694 | | 9/2000 | |
| JP | 2002340199 | A * | 11/2002 | ............... F16J 15/32 |
| JP | 2010 06105 | A * | 3/2010 | |
| JP | 2010060105 | A | 3/2010 | |

OTHER PUBLICATIONS

Extended European search report dated Feb. 8, 2016.
Japanese Office Action dated Jan. 24, 2017 with English translation.

* cited by examiner

STERN TUBE SEALING DEVICE

CROSS-REFERENCE TO RELATED APPLICATIONS

This application is a National Stage of International Application No. PCT/JP2013/068653, filed Jul. 8, 2013, which claims priority to Japanese Application No. 2012-167520, filed Jul. 27, 2012. The entire disclosures of each of the above applications are incorporated herein by reference.

FIELD

The present disclosure relates to a stern tube sealing device which serves to seal an outer periphery of a propeller shaft in a marine vessel.

BACKGROUND

In the past, there has been known a stern tube sealing device which is formed in a stern tube for rotatably supporting a propeller shaft of a marine vessel, and seals an outer periphery of the propeller shaft (for example, refer to a first patent literature). A stern tube sealing device according to a conventional example will be explained while referring to FIG. 4. FIG. 4 is a view showing the schematic construction of the stern tube sealing device according to the conventional example.

In the stern tube sealing device 400 according to this conventional example, a first seal ring chamber 411 and a second seal ring chamber 412 are formed in a seal housing 410 through which a propeller shaft 200 is inserted. The second seal ring chamber 412 is located at an inboard side of the first seal ring chamber 411.

A first seal ring 421 is arranged in the first seal ring chamber 411. A second seal ring 422 is arranged in the second seal ring chamber 412. The first seal ring 421 and the second seal ring 422 are fixedly secured to the propeller shaft 200, so that they rotate together with the propeller shaft 200. In addition, the first seal ring 421 has a sealing surface 421a which is in contact with an inboard side wall surface in the first seal ring chamber 411 so as to slide with respect to the wall surface. The second seal ring 422 has an inboard side sealing surface 422a which is in contact with an inboard side wall surface in the second seal ring chamber 412 so as to slide with respect to the wall surface.

The first seal ring chamber 411 is in communication with an outside of the marine vessel. In addition, the first seal ring chamber 411 and the second seal ring chamber 412 are in communication with each other through sliding portions of the wall surface of the first seal ring chamber 411 and the sealing surface 421a of the first seal ring 421.

In this stern tube sealing device 400, sealing is exhibited by maintaining a state in which at least either one of the sealing surfaces 421a, 422a of the first seal ring 421 and the second seal ring 422 is in intimate contact with the inboard side wall surface of the first seal ring chamber 411 or the second seal ring chamber 412.

Further, sea water SW is introduced into the individual insides of the first seal ring chamber 411 and the second seal ring chamber 412 through a first sea water introduction pipe 431 and a second sea water introduction pipe 432, respectively. As a result of this, the individual seal rings 421, 422 can be cooled with the sea water which is filled in each of the seal ring chambers 411, 412.

However, in cases where slurry is mixed in the sea water SW, when the sea water SW is introduced into the seal ring chambers 411, 412, there will be a fear that the slurry may come into the sliding portions between the sealing surfaces 421a, 422a of the individual seal rings 421, 422 and the wall surfaces of the individual seal ring chambers 411, 412. When the slurry having come into these sliding portions deposits on the sliding portions, there will occur a problem that sealing efficiency is decreased. In addition, another problem will also occur in which the wall surfaces of the seal ring chambers 411, 412 wear due to the slurry.

Here, note that in cases where the construction of the stern tube sealing device is such that each seal ring is fixedly secured to a seal housing side in each seal ring chamber, with the sealing surface of each seal ring being slidable while being in contact with the outer peripheral surface of the propeller shaft, too, when the sea water with the slurry mixed therein is introduced into each seal ring chamber, the slurry may come into the sliding portions of the sealing surface of each seal ring and the outer peripheral surface of the propeller shaft. In this case, too, the deposition of the slurry on the sliding portions causes a problem that sealing efficiency is decreased, and another problem that the wall surface of the propeller shaft wears due to the slurry.

In addition, the problems as mentioned above can of course occur, not only in cases where sea water is introduced into the seal ring chambers, but also in cases where water (i.e., outboard water) such as in rivers, etc., is introduced into seal ring chambers in a stern tube sealing device in a marine vessel used in rivers or the like, if slurry is mixed in the water such as river water.

PRIOR ART REFERENCES

Patent Literatures

First Patent Literature: Japanese Patent Laid-Open Publication No. 2010-60105

SUMMARY

Problems to be Solved by the Disclosure

The present disclosure has for its object to suppress, in a stern tube sealing device, slurry contained in outboard water (i.e., water outside a marine vessel) from depositing on sliding portions between a wall surface of a seal ring chamber or an outer peripheral surface of a propeller shaft and a sealing surface of a seal ring.

Means for Solving the Problems

The present disclosure resides in a stern tube sealing device which serves to seal an outer periphery of a propeller shaft in a marine vessel, and which includes: a seal housing through which said propeller shaft is inserted; a first seal ring that is arranged in a first seal ring chamber formed in said seal housing, and has a sealing surface which slides with respect to a wall surface of said first seal ring chamber or an outer peripheral surface of said propeller shaft; and a second seal ring that is arranged in a second seal ring chamber formed in said seal housing at an inboard side of said first seal ring chamber, and has a sealing surface which slides with respect to a wall surface of said second seal ring chamber or the outer peripheral surface of said propeller shaft; wherein said first seal ring chamber is in communication with an outside of the marine vessel, and said first seal ring chamber and said second seal ring chamber are in communication with each other through sliding portions between the wall surface of said first seal ring chamber or the outer peripheral surface of said propeller shaft and the sealing surface of said first seal ring; and wherein outboard water is filled in said first seal ring chamber, and clear water is filled in said second seal ring chamber.

According to the present disclosure, the clear water with no slurry mixed therein is filled in the second seal ring chamber. As a result, it is possible to suppress slurry from depositing on sliding portions between the wall surface of the second seal ring chamber or the outer peripheral surface of the propeller shaft and the sealing surface of the second seal ring.

In addition, in the stern tube sealing device according to the present disclosure, the first seal ring chamber and the second seal ring chamber are in communication with each other through the sliding portions between the wall surface of the first seal ring chamber or the outer peripheral surface of the propeller shaft and the sealing surface of the first seal ring. For that reason, the clear water filled in the second seal ring chamber comes into the sliding portions between the wall surface of the first seal ring chamber or the outer peripheral surface of the propeller shaft and the sealing surface of the first seal ring, and then flows out into the first seal ring chamber. Thus, even if slurry is mixed in the outboard water which has been filled in the first seal ring chamber, it becomes difficult for the slurry to come into the sliding portions between the wall surface of the first seal ring chamber or the outer peripheral surface of the propeller shaft and the sealing surface of the first seal ring. Accordingly, according to the present disclosure, it is also possible to suppress the slurry from depositing on the sliding portions between the wall surface of the first seal ring chamber or the outer peripheral surface of the propeller shaft and the sealing surface of the first seal ring.

Here, in the stern tube sealing device according to the present disclosure, the pressure of the clear water in the second seal ring chamber may also be made higher than the pressure of the water in the first seal ring chamber.

According to this, it becomes easy for the clear water filled in the second seal ring chamber to come into the sliding portions between the wall surface of the first seal ring chamber or the outer peripheral surface of the propeller shaft and the sealing surface of the first seal ring, and then flow out to the first seal ring chamber side. For that reason, it becomes more difficult for the slurry, which is contained in the outboard water filled in the first seal ring chamber, to come into the sliding portions between the wall surface of the first seal ring chamber or the outer peripheral surface of the propeller shaft and the sealing surface of the first seal ring. Accordingly, it becomes possible to suppress the slurry from depositing on these sliding portions in a more effective manner.

Moreover, in the stern tube sealing device according to the present disclosure, the pressure of the clear water in the second seal ring chamber may also be made lower than the pressure of the water in the first seal ring chamber.

According to this, the sealing surface of the first seal ring is more strongly pushed against the wall surface of the first seal ring chamber or the outer peripheral surface of the propeller shaft by means of the water pressure in the first seal ring chamber. For that reason, it becomes more difficult for the slurry, which is contained in the outboard water filled in the first seal ring chamber, to come into the sliding portions between the wall surface of the first seal ring chamber or the outer peripheral surface of the propeller shaft and the sealing surface of the first seal ring. Accordingly, it becomes possible to suppress the slurry from depositing on these sliding portions in a more effective manner.

Further, according to the above, it also becomes difficult for the clear water filled into the second seal ring chamber to come into the sliding portions between the sealing surface of the first seal ring and the wall surface of the first seal ring chamber or the outer peripheral surface of the propeller shaft. In other words, it becomes difficult for the clear water to flow out into the first seal ring chamber from the second seal ring chamber. For that reason, it becomes possible to decrease the amount of supply of the clear water into the second seal ring chamber.

In the above-mentioned case, it becomes difficult for the clear water in the second seal ring chamber to decrease. Accordingly, in the above-mentioned case, it may also be constructed such that the clear water is sealed in the second seal ring chamber. According to this, it becomes unnecessary to provide a device for making additional supply of the clear water into the second seal ring chamber or a device for causing the clear water to discharge from the interior of the second seal ring chamber. For that reason, the structure of the stern tube sealing device can be further simplified.

Effect of the Disclosure

According to the present disclosure, in a stern tube sealing device, it is possible to suppress the slurry contained in outboard water from depositing on sliding portions between a wall surface of a seal ring chamber or an outer peripheral surface of a propeller shaft and a sealing surface of a seal ring.

DRAWINGS

DETAILED DESCRIPTION

Hereinafter, specific embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

Embodiment

Figure 1:
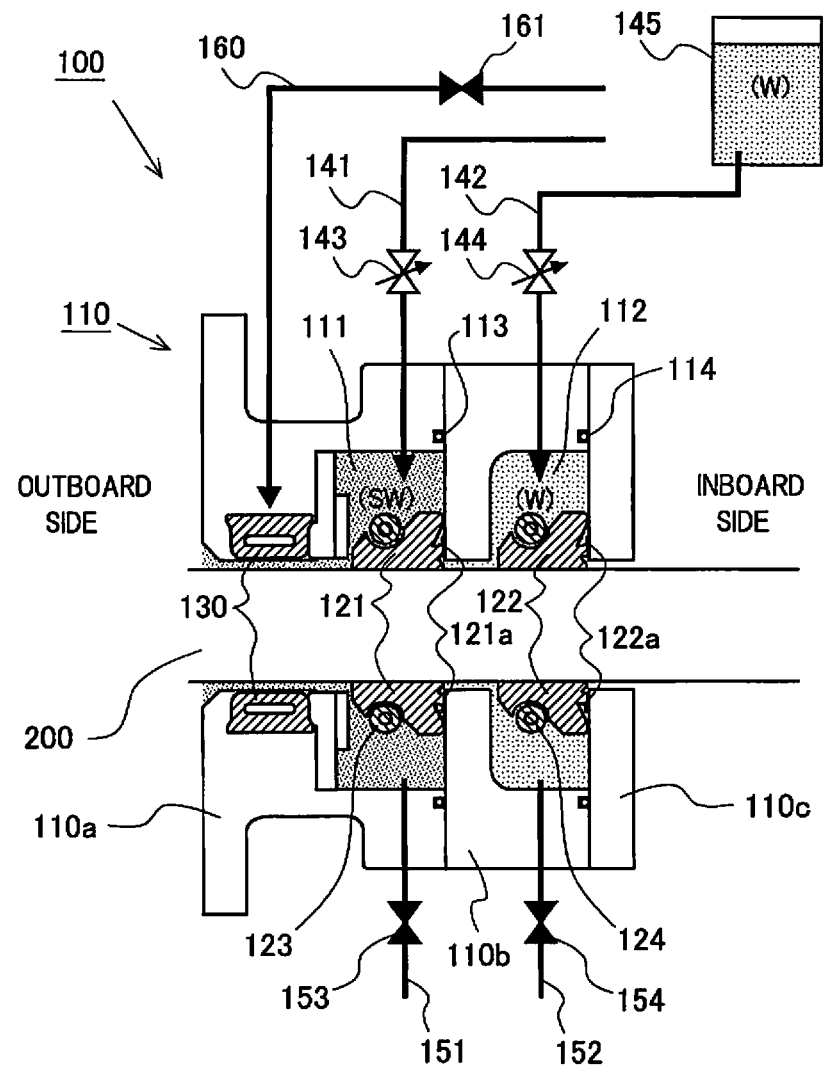
FIG. 1 is a view showing the schematic construction of a stern tube sealing device according to an embodiment of the present disclosure.
Figure 2:
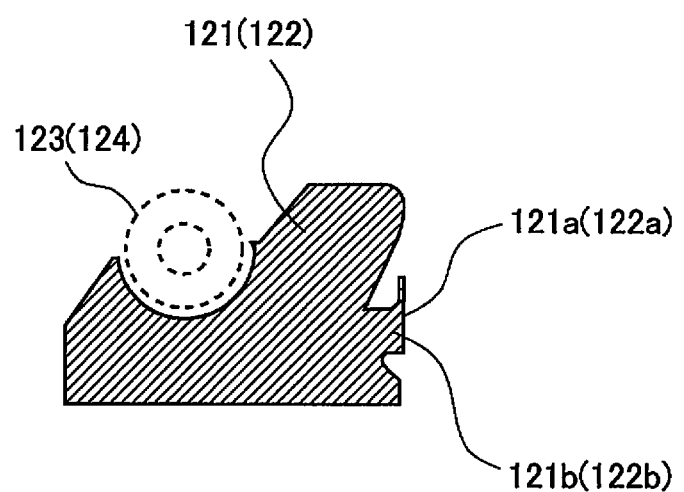
FIG. 2 is a schematic cross sectional view of seal rings according to the embodiment of the present disclosure.

A stern tube sealing device according to an embodiment of the present disclosure will be explained with reference to FIGS. 1 and 2. FIG. 1 is a view showing the schematic construction of the stern tube sealing device according to this embodiment. FIG. 2 is a schematic cross sectional view of seal rings formed in the stern tube sealing device according to this embodiment. Here, note that in FIG. 1, a left side is an outboard side (stern side), and a right side is an inboard side (bow side).

In addition, it is assumed that the stern tube sealing device according to this embodiment is for a marine vessel used in seas. In other words, water outside the marine vessel (i.e., outboard water) is sea water. However, the stern tube sealing device according to the present disclosure can also be applied to a stern tube sealing device for a marine vessel used in rivers, etc.

In the stern tube sealing device 100, a propeller shaft 200 is inserted through a seal housing 110. The propeller shaft 200 is equipped, an outboard side tip end portion thereof, with a propeller (not shown). The seal housing 110 is composed of a seal case 110*a*, a first mating ring 110*b* and a second mating ring 110*c*, which are fastened to one another by means of bolts or the like. An O ring 113 is interposed between the seal case 110*a* and the first mating ring 110*b*, so that these seal case and mating ring are sealed by means of the O ring 113. In addition, an O ring 114 is interposed between the first mating ring 110*b* and the second mating ring 110*c*, so that these first and second mating rings are sealed by means of the O ring 114.

The seal case 110*a*, the first mating ring 110*b* and the second mating ring 110*c* have their inner peripheral surfaces arranged in positions which are separated by a predetermined gap with respect to an outer peripheral surface of the propeller shaft 200. In other words, the predetermined gap is provided between the inner peripheral surface of the seal housing 110 and the outer peripheral surface of the propeller shaft 200.

The seal case 110*a* is formed on its inner peripheral surface at the side of the first mating ring 110*b* with an annular concave portion along the outer peripheral surface of the propeller shaft 200. A first seal ring chamber 111 is formed by an annular space which is surrounded by a wall surface of the concave portion of this seal case 110*a* and a wall surface of the first mating ring 110*b* at the side of the seal case 110*a*.

In addition, the first mating ring 110*b* is also formed on its inner peripheral surface at the side of the second mating ring 110*c* with an annular concave portion along the outer peripheral surface of the propeller shaft 200. A second seal ring chamber 112 is formed by an annular space which is surrounded by a wall surface of the concave portion of this first mating ring 110*b* and a wall surface of the second mating ring 110*c* at the side of the first mating ring 110*b*. That is, in the seal housing 110, the second seal ring chamber 112 is located at an inboard side of the first seal ring chamber 111.

A first seal ring 121 is arranged in the first seal ring chamber 111. A second seal ring 122 is arranged in the second seal ring chamber 112. The first seal ring 121 and the second seal ring 122 are fixedly secured to the propeller shaft 200 by means of garter springs 123, 124, respectively, so that they rotate together with the propeller shaft 200.

The individual seal rings 121, 122 have lip portions 121*b*, 122*b*, respectively. The lip portion 121*b* of the first seal ring 121 is in contact with an inboard side wall surface of the first seal ring chamber 111 (i.e., a wall surface of the first mating ring 110*b* at the side of the seal case 110*a*). A surface in this lip portion 121*b* in contact with the wall surface of the first seal ring chamber 111 is a sealing surface 121*a* which slides with respect to the wall surface of the first seal ring chamber 111.

Moreover, the lip portion 122*b* of the second seal ring 122 is in contact with an inboard side wall surface of the second seal ring chamber 112 (i.e., a wall surface of the second mating ring 110*c* at the side of the first mating ring 110*b*). A surface in this lip portion 122*b* in contact with the wall surface of the second seal ring chamber 112 is a sealing surface 121*a* which slides with respect to the wall surface of the second seal ring chamber 112.

As mentioned above, the predetermined gap or interval is provided between the inner peripheral surface of the seal housing 110 and the outer peripheral surface of the propeller shaft 200. As a result, the first seal ring chamber 111 is in communication with the outside of the marine vessel. In addition, the first seal ring chamber 111 and the second seal ring chamber 112 are in communication with each other through the sliding portions between the sealing surface 121*a* of the first seal ring 121 and the wall surface of the first seal ring chamber 111.

In the stern tube sealing device 100 as constructed above, sealing is exhibited by maintaining a state in which at least either one of the sealing surfaces 121*a*, 122*a* of the first seal ring 121 and the second seal ring 122 is in intimate contact with the wall surface of the first seal ring chamber 111 or the second seal ring chamber 112.

Further, another concave portion is formed at a more outboard side than the concave portion in the inner peripheral surface of the seal case 110*a* which forms the first seal ring chamber 111. An inflatable seal 130 is arranged in this concave portion. An air introduction pipe 160 is connected to the inflatable seal 130. A valve 161 is arranged in the air introduction pipe 160.

When the valve 161 is opened, compressed air will be sent into the inflatable seal 130 through the air introduction pipe 160. As the compressed air is sent into the inflatable seal 130, the inflatable seal 130 inflates or swells. Then, by the swollen inflatable seal 130 coming into intimate contact with the outer peripheral surface of the propeller shaft 200, the outer periphery of the propeller shaft 200 is sealed. This inflatable seal 130 is mainly used at the time of checking the seal rings 121, 122, etc.

Moreover, in the stern tube sealing device 100, a sea water introduction pipe 141 is connected to the first seal ring chamber 111, and a clear water introduction pipe 142 is connected to the second seal ring chamber 112.

Into the first seal ring chamber 111, the sea water SW pumped up from outboard sea is introduced through the sea water introduction pipe 141. A flow rate regulation valve 143 is arranged in the sea water introduction pipe 141. The flow rate of the sea water SW to be introduced into the first seal ring chamber 111 is regulated by this flow rate regulation valve 143. By regulating the flow rate of the sea water SW to be introduced into the first seal ring chamber 111, the pressure of the sea water in the first seal ring chamber 111 can be regulated.

In addition, a drain pipe 151 is connected to the first seal ring chamber 111. A drain valve 153 is arranged in the drain pipe 151. By opening this drain valve 153, the sea water SW can be caused to discharge from the interior of the first seal ring chamber 111 through the drain pipe 151

An end of the clear water introduction pipe 142 opposite to its end connected to the second seal ring chamber 112 is connected to a clear water tank 145 in which clear water W equipped by the marine vessel is stored. Then, the clear water W stored in the clear water tank 145 is introduced into the second seal ring chamber 112 through the clear water introduction pipe 142. A flow rate regulation valve 144 is arranged in the clear water introduction pipe 142. The flow rate of the clear water W to be introduced into the second seal ring chamber 112 is regulated by this flow rate regulation valve 144. By regulating the flow rate of the clear water W to be introduced into the second seal ring chamber 112, the pressure of the clear water in the second seal ring chamber 112 can be regulated. Here, note that with respect to a method of supplying clear water, it is not limited to one using the above-mentioned clear water tank, but for example, in cases where the marine vessel has a clear water supply line, clear water may be directly supplied to the second seal chamber through a flow rate regulation valve from this clear water supply line.

Moreover, a drain pipe 152 is connected to the second seal ring chamber 112. A drain valve 154 is arranged in the drain pipe 152. By opening this drain valve 154, the clear water W can be caused to discharge from the interior of the second seal ring chamber 112 through the drain pipe 152.

Advantages of the Structure According to this Embodiment

With the construction according to this embodiment, the sea water SW is introduced into the first seal ring chamber 111, and the clear water W is introduced into the second seal ring chamber 112. As a result of this, the individual seal rings 121, 122 can be cooled with the sea water SW or the clear water W filled in each of the seal ring chambers 111, 112.

In addition, the clear water with no slurry mixed therein is filled in the second seal ring chamber 112. As a result, it is possible to suppress slurry from depositing on sliding portions between the wall surface of the second seal ring chamber 112 and a sealing surface 122a of the second seal ring 122.

Moreover, with the construction according to this embodiment, the first seal ring chamber 111 and the second seal ring chamber 112 are in communication with each other through the sliding portions between the sealing surface 121a of the first seal ring 121 and the wall surface of the first seal ring chamber 111. Here, the above-mentioned state in which communication is made through the sliding portions is said to be a state in which the sealing surface 121a and the wall surface of the first seal ring chamber 111 are in contact with each other in such a manner that the sea water SW or the clear water W, which is a target for hermetic seal, is permitted to permeate into between the sealing surface 121a and the wall surface of the first seal ring chamber 111, within a range in which the sealing by the sliding portions is not affected. The same applies to the sliding portions between the sealing surface 122a and the wall surface of the second seal ring chamber 112. Thus, the construction is such that a certain amount of leakage of the fluid to be sealed to the sliding portions is permitted, so that the fluid to be sealed is made to interpose between the sealing surface 121a and the wall surface of the first seal ring chamber 111, thereby enhancing lubrication in the sliding portions. In this embodiment, it is constructed such that the clear water filled in the second seal ring chamber 112 comes into the sliding portions between the wall surface of the first seal ring chamber 111 and the sealing surface 121a of the first seal ring 121. As a result of this, it is possible to enhance the lubrication in the sliding portions between the wall surface of the first seal ring chamber 111 and the sealing surface 121a of the first seal ring 121 by means of the clear water. In addition, even if slurry is mixed in the sea water filled in the first seal ring chamber 111, due to the flow of the clear water from the side of the second seal ring chamber 112 to the side of the first seal ring chamber 111, it becomes difficult for the slurry to come into the sliding portions between the wall surface of the first seal ring chamber 111 and the sealing surface 121a of the first seal ring 121. Accordingly, it is also possible to suppress the slurry from depositing on the sliding portions between the wall surface of the first seal ring chamber 111 and the sealing surface 121a of the first seal ring 121.

Because the slurry is suppressed from depositing on the sliding portions between the wall surface of each of the seal ring chambers 111, 112 and the sealing surfaces 121a, 122a of the first seal ring 121, it is possible to suppress reduction in sealing due to the slurry. In addition, it is also possible to suppress contacting portions in the wall surfaces of the individual seal ring chambers 111, 112 (i.e., the wall surfaces of the mating rings 110b, 110c) with the sealing surfaces 121a, 122a of the individual seal rings 121, 122 from wearing out due to the slurry.

First Example of the Water Pressures in the Seal Ring Chambers

In the stern tube sealing device 100 according to this embodiment, the pressure of the clear water in the second seal ring chamber 112 may also be made higher than the pressure of the sea water in the first seal ring chamber 111.

In this case, it becomes difficult for the clear water W filled in the second seal ring chamber 112 to come into the sliding portions between the wall surface of the first seal ring chamber 111 and the sealing surface 121a of the first seal ring 121, and then flow out to the side of the first seal ring chamber 111. For that reason, it becomes more difficult for the slurry, which is contained in the sea water SW filled in the first seal ring chamber 111, to come into the sliding portions between the wall surface of the first seal ring chamber 111 and the sealing surface 121a of the first seal ring 121. Accordingly, it becomes possible to suppress the slurry from depositing on these sliding portions in a more effective manner.

Here, note that, even in cases where it is constructed such that the flow rate regulation valve 144 is not arranged in the clear water introduction pipe 142, the hydrostatic pressure in the second seal ring chamber 112 can be made higher by making the installation position of the clear water tank 145 in the marine vessel higher with respect to a waterline thereof.

Second Example of the Water Pressures in the Seal Ring Chambers

In the stern tube sealing device 100 according to this embodiment, the pressure of the clear water in the second seal ring chamber 112 may also be made lower than the pressure of the sea water in the first seal ring chamber 111.

In this case, the sealing surface 121a of the first seal ring 121 is more strongly pushed against the wall surface of the first seal ring chamber 111 by means of the pressure of the sea water in the first seal ring chamber 111. Accordingly, an amount of float or lift of the lip portion 121b of the first seal ring 121 from the wall surface of the first seal ring chamber 111 becomes small. For that reason, it becomes more difficult for the slurry, which is contained in the sea water SW filled in the first seal ring chamber 111, to come into the sliding portions between the wall surface of the first seal ring chamber 111 and the sealing surface 121a of the first seal ring 121. Accordingly, it becomes possible to suppress the slurry from depositing on these sliding portions in a more effective manner.

In addition, it also becomes difficult for the clear water W filled into the second seal ring chamber 112 to come into the sliding portions between the sealing surface 121a of the first seal ring 121 and the wall surface of the first seal ring chamber 111. In other words, it becomes difficult for the clear water W to flow out into the first seal ring chamber 111 from the second seal ring chamber 112. For that reason, it becomes possible to decrease the amount of supply of the clear water W into the second seal ring chamber 112. As a result of this, the amount of consumption of the clear water W stored in the clear water tank 145 can be suppressed.

[Modification]

Figure 3:
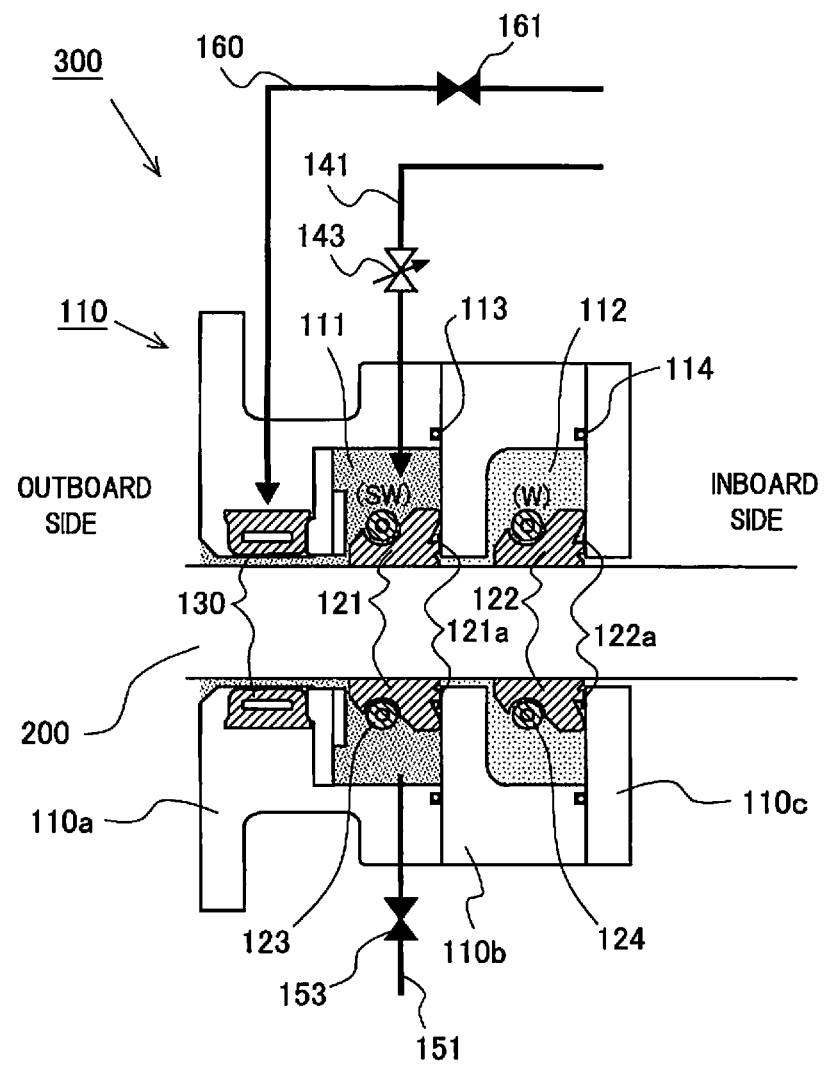
FIG. 3 is a view showing the schematic construction of a stern tube sealing device according to a modification of the present disclosure.
Figure 4:
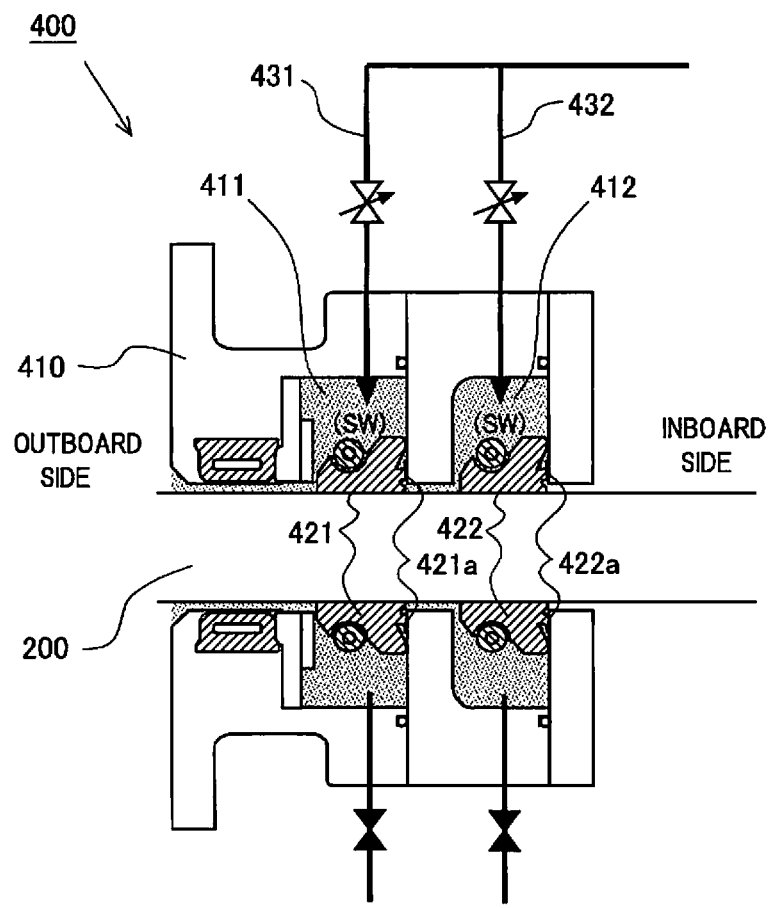
FIG. 4 is a view showing the schematic construction of a stern tube sealing device according to a conventional example.

A stern tube sealing device according to a modification of this embodiment of the present disclosure will be explained with reference to FIG. 3. FIG. 3 is a view showing the schematic construction of the stern tube sealing device according to this modification.

The stern tube sealing device 300 according to this modification is different from the stern tube sealing device 100 according to the above-mentioned embodiment in that the clear water W is sealed in the second seal ring chamber 112.

In addition, in the stern tube sealing device 300, the pressure of the clear water in the second seal ring chamber 112 is lower than the pressure of the sea water in the first seal ring chamber 111. As a result of this, as in the case of [Second Example of the Water Pressures in the Seal Ring Chambers] in the above-mentioned embodiment, it becomes difficult for the clear water W to flow out into the first seal ring chamber 111 from the second seal ring chamber 112, so a decrease in the clear water W sealingly enclosed in the second seal ring chamber 112 is suppressed. Also, it becomes more difficult for the slurry, which is contained in the sea water SW filled in the first seal ring chamber 111, to come into the sliding portions between the wall surface of the first seal ring chamber 111 and the sealing surface 121a of the first seal ring 121.

According to the construction of this modification, it becomes unnecessary to provide a device for introducing the clear water W into the second seal ring chamber 112 (i.e., the clear water introduction pipe 142, the flow control valve 144, and the clear water tank 145 in FIG. 1) and a device for causing the clear water W to discharge from the interior of the second seal ring chamber 112 (i.e., the drain pipe 152 and the drain valve 154 in FIG. 1). For that reason, the structure of the stern tube sealing device 300 can be further simplified.

<Others>

The above-mentioned stern tube sealing devices 100, 300 according to the above-mentioned embodiment and modification are constructed in such a manner that the individual seal rings 121, 122 are fixedly secured to the propeller shaft 200 so as to permit the sealing surfaces 121a, 122a thereof to slide with respect to the wall surfaces of the individual seal ring chambers 111, 112. However, the present disclosure can also be applied to a stern tube sealing device of a construction in which each seal ring is fixedly secured to a seal housing side in each seal ring chamber, with its sealing surface being slidable with respect to an outer peripheral surface of a propeller shaft.

In other words, in cases where a stern tube sealing device is constructed in such a manner, too, sea water may be filled into an outboard side seal ring chamber, and clear water may be filled into an inboard side seal ring chamber. According to this, it becomes difficult for slurry contained in sea water to come into sliding portions between the outer peripheral surface of the propeller shaft and the sealing surface of each seal ring. As a result, it becomes possible to suppress the slurry from depositing on these sliding portions in a more effective manner.

In addition, in the case of such a construction, too, the pressure in the clear water in the inboard side seal ring chamber may also be made higher than the pressure of the sea water in the outboard side seal ring chamber, similar to the case of the above-mentioned embodiments. According to this, similar effects can be obtained, as in the case of [First Example of the Water Pressures in the Seal Ring Chambers] in the above-mentioned embodiment. Moreover, the pressure of the clear water in the inboard side seal ring chamber may also be made lower than the pressure of the sea water in the outboard side seal ring chamber. According to this, similar effects can be obtained, as in the case of [Second Example of the Water Pressures in the Seal Ring Chambers] in the above-mentioned embodiment.

EXPLANATION OF REFERENCE NUMERALS AND CHARACTERS

100 . . . stern tube sealing device
110 . . . seal housing
110a . . . seal case
110b . . . first mating ring
110c . . . second mating ring
111 . . . first seal ring chamber
112 . . . second seal ring chamber
121 . . . first seal ring
122 . . . second seal ring
121a, 122a . . . sealing surfaces
122b, 122b . . . lip portions
141 . . . sea water introduction pipe
142 . . . clear water introduction pipe
143, 144 . . . flow rate regulation valve
145 . . . clear water tank

The invention claimed is:

1. A stern tube sealing device which seals an outer periphery of a propeller shaft in a marine vessel, said stern tube sealing device comprising:
a seal housing through which said propeller shaft is inserted;
a first seal ring that is arranged in a first seal ring chamber formed in said seal housing, and has a sealing surface which slides with respect to a wall surface of said first seal ring chamber, or an outer peripheral surface of said propeller shaft; and
a second seal ring that is arranged in a second seal ring chamber formed in said seal housing at an inboard side of said first seal ring chamber, and has a sealing surface which slides with respect to a wall surface of said second seal ring chamber, or the outer peripheral surface of said propeller shaft;
wherein said first seal ring chamber is in communication with an outside of the marine vessel, and
said first seal ring chamber and said second seal ring chamber are in communication with each other through sliding portions between the wall surface of said first seal ring chamber or the outer peripheral surface of said propeller shaft and the sealing surface of said first seal ring;
wherein outboard water is filled into said first seal ring chamber;
clear water from an on-board water tank is filled into said second seal ring chamber so that clear water being received in the second sealing chamber is sealed by the first seal ring and the second seal ring, wherein the pressure of the clear water in said second seal ring chamber is lower than the pressure of the outboard water in said first seal ring chamber; and
a drain pipe connected directly to an inside of the second seal ring chamber that receives clear water and including a drain valve in the drain pipe wherein each sealing ring has a lip portion, the lip portion of one of the sealing rings directly contacts an inboard side wall surface of one of the respective first and second seal ring chambers and slides with respect to the inboard wall surface.

2. The stern tube sealing device as set forth in claim 1, wherein the clear water is sealingly enclosed in said second seal ring chamber.

3. The stern tube sealing device as set forth in claim 1, further comprising a sea water introduction pipe connected to the first seal ring chamber and a flow rate regulation valve in the sea water introduction pipe.

* * * * *